United States Patent
Bastide et al.

(10) Patent No.: US 11,574,119 B2
(45) Date of Patent: Feb. 7, 2023

(54) EFFICIENT STARTING POINTS IN MOBILE SPREADSHEETS

(71) Applicant: INTERNATIONAL BUSINESS MACHINES CORPORATION, Armonk, NY (US)

(72) Inventors: Paul R. Bastide, Boxford, MA (US); Sean Callanan, Dublin (IE); Mark Gargan, Dublin (IE); Fred Raguillat, Meath (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 591 days.

(21) Appl. No.: 15/278,389

(22) Filed: Sep. 28, 2016

(65) Prior Publication Data
US 2018/0089160 A1    Mar. 29, 2018

(51) Int. Cl.
*G06F 40/18*    (2020.01)
*G06F 3/0484*    (2022.01)
*G06F 40/106*    (2020.01)

(52) U.S. Cl.
CPC ............ *G06F 40/18* (2020.01); *G06F 3/0484* (2013.01); *G06F 40/106* (2020.01)

(58) Field of Classification Search
CPC ................. G06F 9/4443; G06F 3/0481; G06F 17/30867; G06F 17/3089; G06F 17/30038; G06F 40/18; G06F 3/0484; G06F 40/106; G06Q 30/02
See application file for complete search history.

(56) References Cited

U.S. PATENT DOCUMENTS

| | | | |
|---|---|---|---|
| 8,321,780 B2 | 11/2012 | Erwig et al. | |
| 8,689,095 B2 | 4/2014 | Parish et al. | |
| 9,037,975 B1* | 5/2015 | Taylor | G06F 17/30905 715/733 |
| 9,858,244 B1* | 1/2018 | Bjorkegren | G06F 17/11 |
| 10,365,798 B1* | 7/2019 | El Kaissi | G06F 3/0481 |
| 2002/0030754 A1* | 3/2002 | Sugimoto | H04N 5/23293 348/333.02 |
| 2005/0120311 A1* | 6/2005 | Thrall | G06F 16/9535 715/811 |
| 2005/0182773 A1* | 8/2005 | Feinsmith | G06Q 10/10 |
| 2007/0067744 A1* | 3/2007 | Lane | G06F 3/0236 715/860 |
| 2007/0133842 A1* | 6/2007 | Harrington | G06K 9/036 382/112 |
| 2007/0168877 A1* | 7/2007 | Jain | G06F 3/04842 715/772 |

(Continued)

OTHER PUBLICATIONS

"The Microsoft Office Open XML formats", pp. 1-32 (Year: 2005).*

(Continued)

*Primary Examiner* — John T Repsher, III
(74) *Attorney, Agent, or Firm* — Tutunjian & Bitetto, P.C.; Scott Dobson

(57) ABSTRACT

Methods and systems for navigating to an initial position in a document include weighting historical user actions within a document. Initial display positions within the document are determined based on the weighted historical user actions. A selected initial display positions is navigated to in accordance with a user selection.

19 Claims, 5 Drawing Sheets

(56) References Cited

U.S. PATENT DOCUMENTS

| | | | | |
|---|---|---|---|---|
| 2008/0229254 | A1* | 9/2008 | Warner | G06F 3/04812 715/856 |
| 2008/0244377 | A1* | 10/2008 | Erwig | G06F 40/18 715/212 |
| 2009/0122018 | A1* | 5/2009 | Vymenets | G06F 3/04817 345/173 |
| 2009/0313537 | A1 | 12/2009 | Fu et al. | |
| 2010/0299592 | A1* | 11/2010 | Zalewski | G06F 1/1626 715/243 |
| 2011/0131479 | A1* | 6/2011 | Padgett | G06F 3/04895 715/223 |
| 2011/0167376 | A1* | 7/2011 | Sauve | G06F 9/4443 715/777 |
| 2011/0191344 | A1* | 8/2011 | Jin | G06F 17/30 707/739 |
| 2011/0202847 | A1* | 8/2011 | Dimitrov | G06F 3/0481 715/738 |
| 2011/0307772 | A1* | 12/2011 | Lloyd | G06F 40/18 715/212 |
| 2012/0005623 | A1* | 1/2012 | Ishak | G06F 3/0485 715/786 |
| 2012/0036455 | A1* | 2/2012 | Holt | G06F 3/0482 715/753 |
| 2012/0066600 | A1* | 3/2012 | Nickel | G06F 3/0481 715/727 |
| 2012/0084666 | A1* | 4/2012 | Hickman | H04L 67/02 715/751 |
| 2012/0137201 | A1* | 5/2012 | White | G06F 17/30899 715/205 |
| 2012/0317145 | A1* | 12/2012 | Reghetti | G06F 21/6209 707/781 |
| 2013/0002585 | A1* | 1/2013 | Jee | G06F 3/0488 345/173 |
| 2013/0086490 | A1* | 4/2013 | Roskind | G06F 17/30902 715/760 |
| 2013/0166394 | A1* | 6/2013 | Churchill | G06Q 30/0276 705/14.72 |
| 2013/0346844 | A1* | 12/2013 | Graepel | G06F 17/18 715/219 |
| 2015/0169531 | A1* | 6/2015 | Campbell | G06F 17/246 715/212 |
| 2016/0034127 | A1* | 2/2016 | Seo | G06F 3/04883 715/769 |
| 2017/0249069 | A1* | 8/2017 | Zamir | G06F 3/0484 |

OTHER PUBLICATIONS https://www.reviversoft.com/file-extensions/mobi pp. 1-8 (Year: 2019).*

K. Sivanantha, View the last Cell Updated when opening a Spreadsheet, https://productforums.google.com/forum/#!topic/docs/fye51EGv4pk, Aug. 2013.

* cited by examiner

EFFICIENT STARTING POINTS IN MOBILE SPREADSHEETS

BACKGROUND

Technical Field

The present invention generally relates to user interfaces for mobile devices and, more particularly, to selecting an initial display region in a spreadsheet displayed on a mobile device.

Description of the Related Art

As business users transition to the use of mobile devices as their primary interface for corporate data, user interface challenges particular to the mobile environment become more prominent. One example is in spreadsheets, where large amounts of data are potentially available in a two-dimensional field, making it difficult to adequately display all of the data on the relatively small screen of a mobile device.

One particular challenge in rendering spreadsheets is selecting the initial display region when the spreadsheet is opened. When very little data is displayed at once, it can be difficult for users to determine where they are in the spreadsheet and how to get to the data that they are trying to access. Existing solutions have a preferential starting position (e.g., the top, leftmost cell in the spreadsheet) or open to a region having the most recently edited cell. However, these solutions fail to provide adequate navigation options to mobile users.

SUMMARY

A method for navigating to an initial position in a document includes weighting historical user actions within a document. Initial display positions within the document are determined based on the weighted historical user actions. A selected initial display positions is navigated to in accordance with a user selection.

A system for navigating to an initial position in a document includes an analysis module comprising a processor configured to weight historical user actions within a document and to determine initial display positions within the document based on the weighted historical user actions. A user interface is configured to navigate to a selected one of the initial display positions in accordance with a user selection.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein.

DETAILED DESCRIPTION

Embodiments of the present invention provide users of a document with a selection of initial display points, based on recorded activity within the document. The user selections one option and the present embodiments navigate directly to that initial display point, thereby allowing the user to more efficiently access the data within the document that they need.

While the present embodiments are described with specific focus on the use of spreadsheets on mobile devices, it should be understood that the present principles are not limited to these environments. For example, other types of documents that may benefit from the present embodiments in selecting an initial display point include but are not limited to, e.g., text documents, wiki pages, presentations, etc. It is also contemplated that multimedia documents, including audio and video files, may be used. In addition, any type of processing device may be used instead of a mobile device—indeed the problem of determining where to begin when displaying data is one that affects all devices when displaying data sets that are large enough in size.

Figure 1:
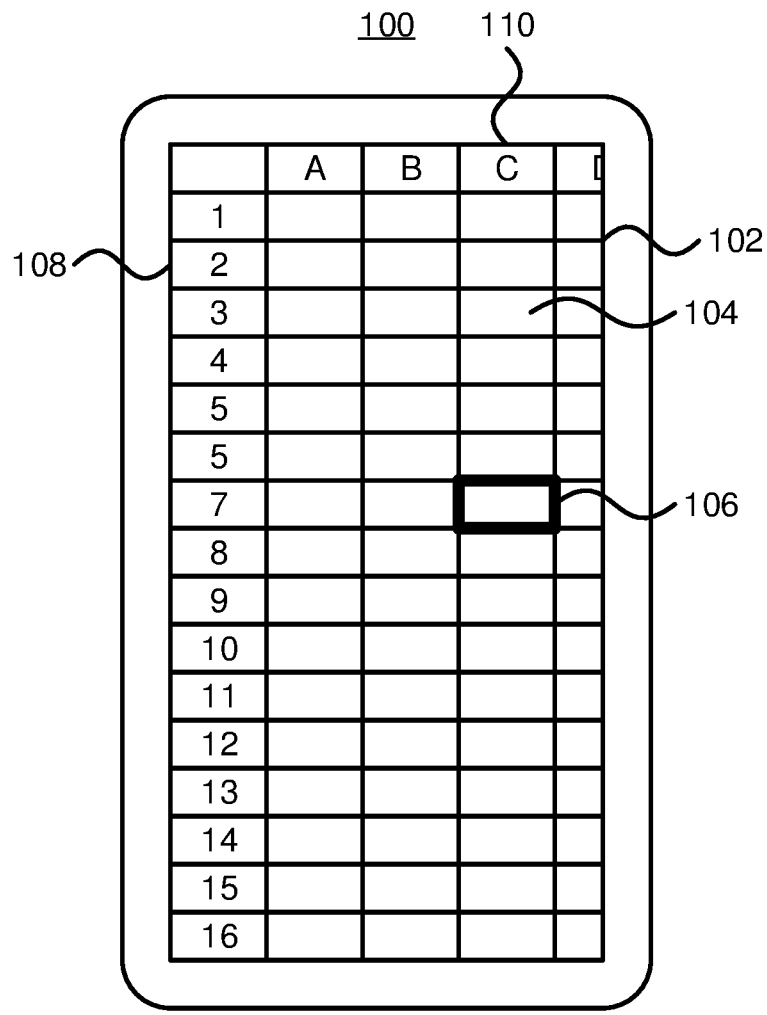
FIG. 1 is a diagram of a mobile device displaying a document in accordance with the present principles.

Referring now to the drawings in which like numerals represent the same or similar elements and initially to FIG. 1, a mobile device 100 is shown. The mobile device 100 includes a screen 102, which displays a spreadsheet made up of a two-dimensional grid of cells 104. One active cell 106 is shown. Each cell 104 may display any variety of data including, e.g., textual data, numerical data, graphical data, numerical data, temporal data, economic data, etc. The active region 106 is used to indicate which of the cells 104 a user can interact with currently. It should be noted that the active region 106 may be a single cell, as shown in FIG. 1, or may include an entire row, an entire column, a two dimensional grid of cells, a scattered selection of cells, etc. The rows 108 are indicated by numbers and the columns 110 are indicated by letters in this example, though it should be understood that this designation may be altered by those having ordinary skill in the art or by the user to suit their design needs and preferences.

In this example, the display 102 shows the spreadsheet in the top, left-most region. This is a suitable default display option for the present embodiments, for example when the spreadsheet has never been opened before, but it should be understood that one or more alternative initial display points may be provided to the user for selection instead. For large sets of data, it is relatively unlikely that the user will be looking for the data displayed in this specific region of the spreadsheet. As a result, the user will navigate from the initial point to the location where the desired data can be found or altered. To accomplish this, the user takes advantage of a user interface to input commands. Such commands may include the use of directional keys on a keyboard to move the display region or the active cell 106 or may include, for example, swiping on the screen 102 to input touch commands or by dragging a scroll bar with a finger or a pointer device. The user may furthermore select specific cells by tapping, clicking, or keyboard navigation to select a new active cell 106.

In this specific example, the user has navigated the active cell 106 from the 1A cell to the C7 cell. The present embodiments record the user's interactions with the spreadsheet, including navigation commands, selection of cells, and entry of data. In addition, the navigation may be recorded in multiple ways. For example, the user may navigate to column C and then scroll down to row 7. This navigation action may be recorded as navigation to column C, navigation to row 7, and/or navigation to cell C7 specifically.

The present embodiments analyze the recorded actions to identify candidate starting points. In this example, the candidate starting points would include column C, row 7, and cell C7. The user's navigation choices indicate what region (s) of the spreadsheet are likely to be most interesting to the user in the future, although other metrics are also possible. One example of an alternative metric is to recognize patterns in the user's behavior and to extrapolate from those patterns. For example, if the user is entering information in successive cells 104 of a column 110, the next time the user opens the spreadsheet the next empty cell in that column 110 may be presented as one of the initial display positions.

It should be noted that the present embodiments may record actions from multiple users. For example, if a first user and a second user access the spreadsheet and perform navigation actions within the spreadsheet, a third user who has never accessed the spreadsheet before can be offered initial display options based on the recorded data from the first and second users.

Figure 2:
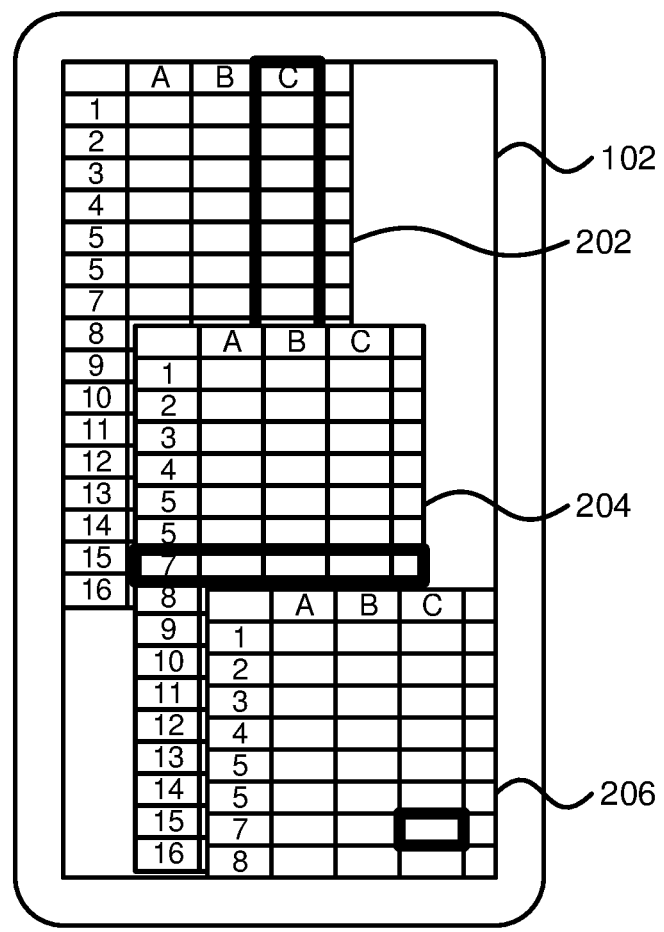
FIG. 2 is a diagram of a mobile device displaying multiple initial display positions for a document in accordance with the present principles.

Referring now to FIG. 2, the mobile device 100 is shown displaying a set of different choices. A first option 202 for the initial display position shows column C being selected as an active region. A second option 204 for the initial display position shows row 7 being selected as an active region. A third option 206 for the initial display position shows cell C7 being selected as an active region. The user has the option of selecting any of the displayed options (e.g., by tapping or clicking on one) to immediately navigate to the displayed position. The user may also choose to proceed without selecting any of the displayed options, in which case a default initial display position (e.g., the top, leftmost cell) may be shown.

The embodiment of FIG. 2 shows that the visual display of a spreadsheet can be scaled down so that multiple options are shown at once. Alternatively, the displayed options may be truncated to show only some of the area around the active region to provide context. In a further alternative embodiment, the options may be displayed as text describing the active region (e.g., by column and/or row designation).

When displaying initial display options, the recorded actions by different users may be weighted differently. For example, if a first and a second user's actions have been recorded and are used to generate initial display options, these actions may be weighted less heavily than a third user's own actions when the third user opens the spreadsheet. In addition, some kinds of action can be weighted more heavily than others—for example, edits to the data in the spreadsheet may indicate that the data in the edited cells are of higher potential interest to users. Thus weighing those actions more heavily makes it more likely that a user will be interested in one of the displayed options.

Figure 3:
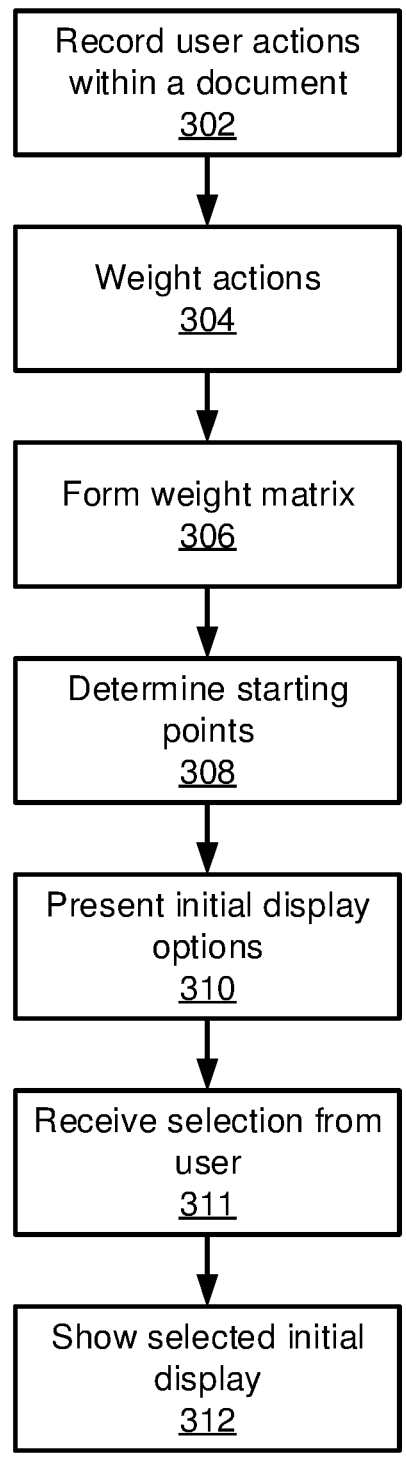
FIG. 3 is a block/flow diagram of a method for navigating to an initial display position within a document in accordance with the present principles.

Referring now to FIG. 3, a method of displaying a document is shown. As noted above, the document may be any form of document including, e.g., a spreadsheet, a text document, etc. Block 302 records user actions within the document. In the example of a spreadsheet document, block 302 may record such information as, e.g., the particular sheet within the document that is being accessed, a column and row position for a user's actions, and the user's identity.

In some cases, the actions may be performed on several different locations within the document (e.g., if multiple separate cells are selected). In addition, block 302 records the type of action being performed. Following the spreadsheet example, exemplary actions can include navigation, viewing, selecting, formatting, updating, and editing. Block 304 assigns a weight to the actions. For example, editing a cell 104 can be weighted more heavily than simply viewing the cell.

Block 306 forms a weight matrix from the recorded user actions. In the spreadsheet example, the weight matrix includes a term for each cell of the spreadsheet. For example, a spreadsheet with eight rows and eight columns may be represented with an 8×8 weight matrix. For each recorded action associated with a cell of the spreadsheet, a weight is added to the weight matrix. For example, if column A of the spreadsheet is selected, a value of '1' can be added to the value of the terms in the first column of the weight matrix. When adding values based on the selection of rows and columns, the scope of the weight may be limited to a visible region on the document. For example, If only ten rows are shown, then only ten entries in a column of the weight matrix may be weighted in response to a user's selection of a cell in that column.

Formulas in spreadsheet cells affected by an edit can also be considered. In one example, a spreadsheet having a value that is a sum of two different other cells may have a weight that is the average of the weights assigned to those cells. Font and style may also affect the weighting, for example with bolded cells having a greater weight.

In one particular embodiment, the block 306 may identify cell types or cell content and add weights to other entries in the weight matrix that correspond to cells of a same type or content as an activated cell. For example, cell types may include dollar values, text, etc., while cell content may include more detailed descriptions of the cell contents such as, e.g., total purchase amounts, inventory quantities, etc.

Based on the weight matrix, block 308 determines one or more initial display position options. This determination may include, for example, locating the cells, columns, or rows with the highest weight values in the weight matrix. The different options are ranked according to weight and block 308 determines a number (e.g., the top three) to present to the user.

Block 310 presents the determined initial display options to the user. In one example, the options may be displayed to the user on screen 102 in any appropriate manner, including for example as a stacked set of user interface views, as shown in FIG. 2. The starting points may be converted to hotspots (e.g., links within a spreadsheet) in the document to indicate their relevance and to make it easier to navigate to those points. The present embodiments may page through the hotspots, such that a user who is not interested in the first hotspot can dismiss that first hotspot and proceed to a second hotspot.

Block 311 receives a selection from the user of one of the initial display options. The input of a selection can be by any appropriate input device including, e.g., a touch screen input, a mouse click, keyboard input, etc. In response to that selection, block 312 shows the selected initial display.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
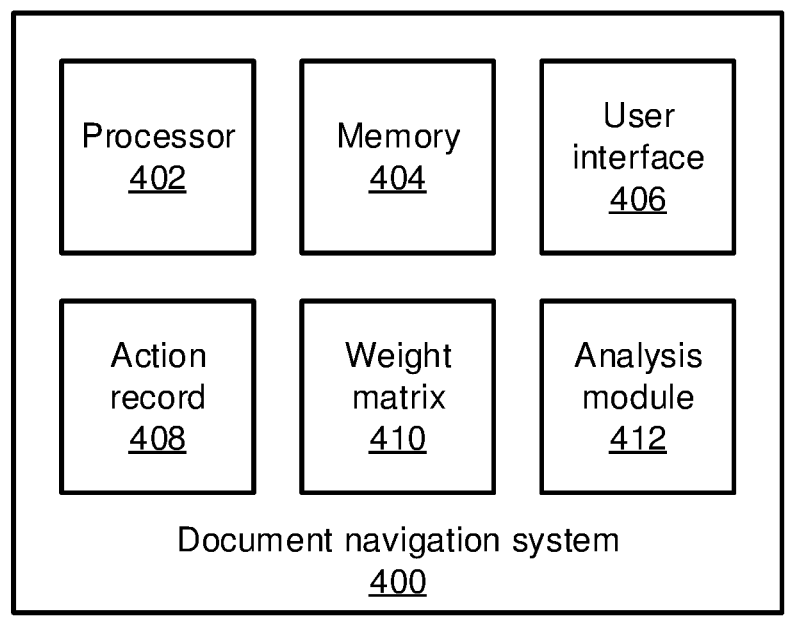
FIG. 4 is a block diagram of a system for navigation within a document in accordance with the present principles.

Referring now to FIG. 4, a document navigation system 400 is shown. The document navigation system 400 includes a hardware processor 402 and a memory 404. In addition, a user interface 406 includes some manner of visual display and an input device, as will be described in greater detail below. The user interface 406 receives user actions as a user interacts with a document that is displayed on the user interface 406 and stores those actions in an action record 408 in memory 404. In addition, the system 400 includes one or more functional modules that can, in one embodiment, be implemented as software that is stored in memory 404 and is executed by hardware processor 402. In an alternative embodiment, the functional module(s) can be implemented as one or more discrete hardware components in the form of, e.g., application specific integrated chips or field programmable gate arrays.

In particular, an analysis module 412 uses the action record 408 to populate the weight matrix 410 as described above. The weight matrix characterizes user interactions with the document to determine likely initial display positions. The analysis module 412 then supplies the likely initial display locations to the user interface 406 for display, whereupon the user selects one initial display location and the user interface 406 navigates to the selected position within the document.

Figure 5:
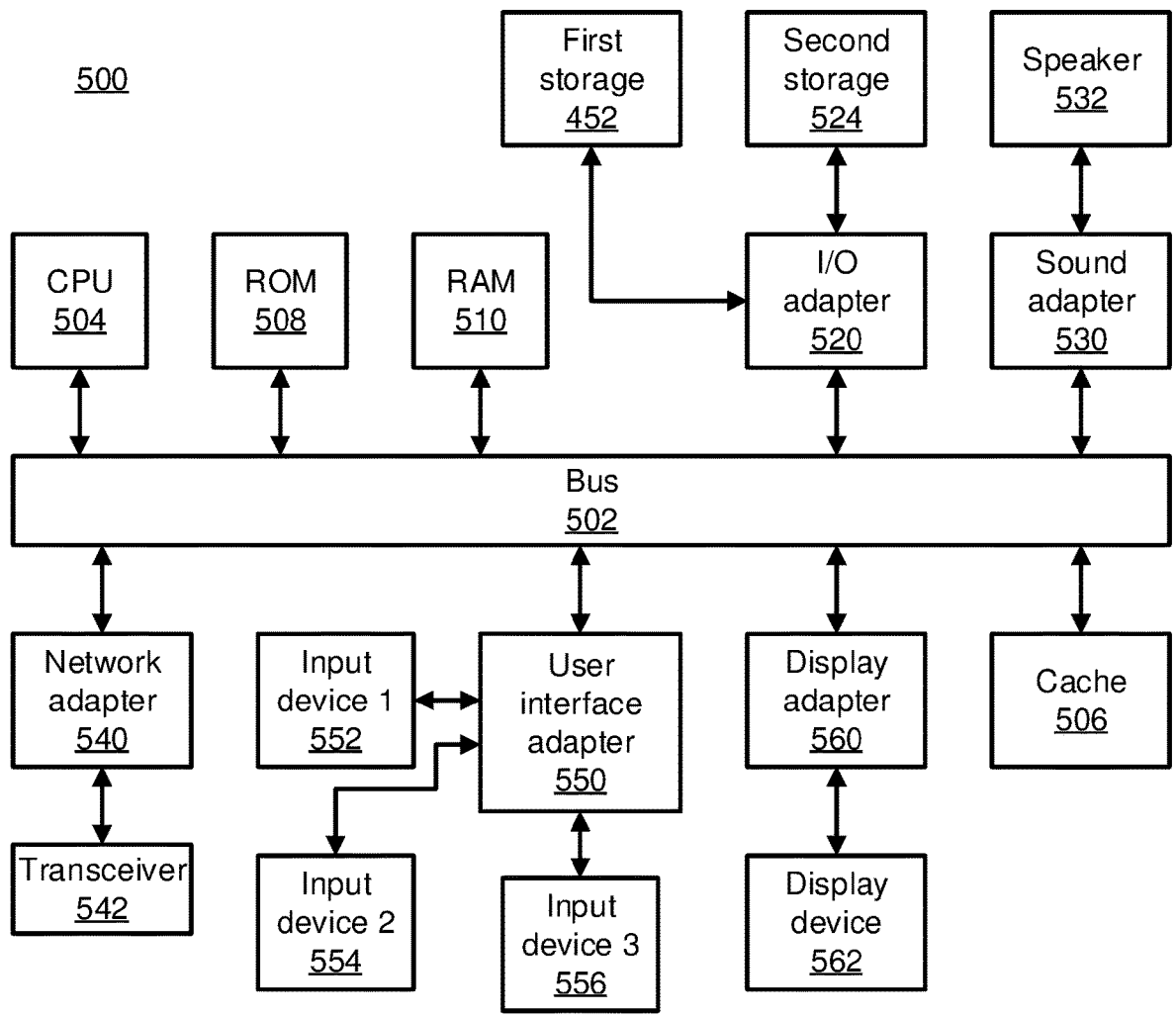
FIG. 5 is a block diagram of a processing system in accordance with the present principles.

Referring now to FIG. 5, an exemplary processing system 500 is shown which may represent the document navigation system 400 and/or the mobile device 100. The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and a display adapter 560, are operatively coupled to the system bus 502.

A first storage device 522 and a second storage device 524 are operatively coupled to system bus 502 by the I/O adapter 520. The storage devices 522 and 524 can be any of a disk storage device (e.g., a magnetic or optical disk storage device), a solid state magnetic device, and so forth. The storage devices 522 and 524 can be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 552, 554, and 556 can be the same type of user input device or different types of user input devices. The user input devices 552, 554, and 556 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

Having described preferred embodiments of efficient starting points in mobile spreadsheets (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for navigating to an initial position in a spreadsheet, comprising:
    weighting a user's historical edit actions within a spreadsheet, including, for a spreadsheet cell that includes a sum of values of multiple respective other spreadsheet cells combining weights from multiple edit actions by averaging weights of the multiple respective other spreadsheet cells;
    determining a plurality of initial display position recommendations within the spreadsheet based on the weighted user's historical edit actions;
    receiving a selection from the user of one of the plurality of initial display position recommendations using a user input device; and
    navigating, upon initial display of the spreadsheet, to a selected one of the plurality of initial display position recommendations in accordance with the selection.

2. The method of claim 1, wherein weighting historical user actions comprises determining a weight matrix comprising entries that correspond to positions within the spreadsheet.

3. The method of claim 2, wherein determining the weight matrix comprises assigning a weight value to every entry in the weight matrix based on the historical user actions.

4. The method of claim 3, wherein determining the plurality of initial display positions comprises ranking every entry in the weight matrix by weight value and selecting a predetermined number of top entries.

5. The method of claim 3, wherein assigning the weight value to every entry in the weight matrix comprises assigning different weight values for different user actions at each position within the spreadsheet.

6. The method of claim 1, further comprising displaying the plurality of initial display positions on a user interface by displaying graphical representations of each of the plurality of initial display positions on a same screen.

7. The method of claim 6, wherein the graphical representations of the plurality of initial display positions are displayed in a stacked arrangement.

8. The method of claim 1, wherein weighting historical user actions comprises combining historical actions from multiple users.

9. A computer program product, the computer program product comprising a computer readable storage medium having program instructions embodied therewith, the program instructions readable by a computer to cause the computer to:
   weight a user's historical edit actions within a spreadsheet, including, for a spreadsheet cell that includes a sum of values of multiple respective other spreadsheet cells, combining weights from multiple edit actions by averaging weights of the multiple respective other spreadsheet cells;
   determine a plurality of initial display position recommendations within the spreadsheet based on the weighted user's historical edit actions;
   receive a selection from the user of one of the plurality of initial display position recommendations using a user input device; and
   navigate, upon initial display of the spreadsheet, to a selected one of the plurality of initial display position recommendations in accordance with the selection.

10. A system for navigating to an initial position in a spreadsheet, comprising:
   an analysis module comprising a processor configured to weight a user's historical edit actions within a spreadsheet, including, for a spreadsheet cell that includes a sum of values of multiple respective other spreadsheet cells, a combination of weights from multiple edit actions as an average of weights of the multiple respective other spreadsheet cells, and to determine a plurality of initial display position recommendations within the spreadsheet based on the weighted user's historical edit actions;
   a user input device configured to receive a selection from the user of one of the plurality of initial display position recommendations; and
   a user interface configured to navigate, upon initial display of the spreadsheet, to a selected one of the plurality of initial display position recommendations in accordance with the selection.

11. The system of claim 10, wherein the analysis module is further configured to determine a weight matrix comprising entries that correspond to positions within the spreadsheet.

12. The system of claim 11, wherein the analysis module is further configured to assign a weight value to every entry in the weight matrix based on the historical user actions.

13. The system of claim 12, wherein the analysis module is further configured to rank every entry in the weight matrix by weight value and selecting a predetermined number of top entries.

14. The system of claim 12, wherein the analysis module is farther configured to assign different weight values for different user actions at each position within the spreadsheet.

15. The system of claim 10, wherein user interface is further configured to display graphical representations of each of the plurality of initial display positions on a same screen.

16. The method of claim 1, wherein the user's historical actions include actions selected from the group consisting of selection of one or more cells in the spreadsheet and entry of data in the spreadsheet.

17. The method of claim 1, wherein weighting the user's historical actions within the spreadsheet includes weighting based on a font and style of respective affected spreadsheet cells.

18. The method of claim 1, wherein weighting the user's historical actions within the spreadsheet includes adding a value to affected spreadsheet cell weights for each historical action.

19. The method of claim 8, wherein weighting historical user actions comprises weighting historical actions from different users by different amounts.

* * * * *